(12) United States Patent
English

(10) Patent No.: US 10,318,925 B2
(45) Date of Patent: *Jun. 11, 2019

(54) FILTERED PEER-TO-PEER BUSINESS COMMUNICATION IN A DISTRIBUTED COMPUTER ENVIRONMENT

(71) Applicant: JDA Software Group, Inc., Scottsdale, AZ (US)

(72) Inventor: Jason R. English, Dallas, TX (US)

(73) Assignee: JDA Software Group, Inc., Scottsdale, AZ (US)

(*) Notice: Subject to any disclaimer, the term of this patent is extended or adjusted under 35 U.S.C. 154(b) by 188 days.

This patent is subject to a terminal disclaimer.

(21) Appl. No.: 14/966,785

(22) Filed: Dec. 11, 2015

(65) Prior Publication Data

US 2017/0169389 A1   Jun. 15, 2017

(51) Int. Cl.
*G06Q 10/10*   (2012.01)
*G06Q 10/02*   (2012.01)
(Continued)

(52) U.S. Cl.
CPC ............ *G06Q 10/10* (2013.01); *G06Q 10/02* (2013.01); *G06Q 10/025* (2013.01);
(Continued)

(58) Field of Classification Search
CPC ............... G06Q 10/10; G06Q 30/0611; G06Q 30/0257; G06Q 40/04; G06Q 10/107;
(Continued)

(56) References Cited

U.S. PATENT DOCUMENTS

| 5,794,207 A | 8/1998 | Walker et al. |
| 5,924,082 A * | 7/1999 | Silverman ............ G06Q 40/00 705/35 |

(Continued)

FOREIGN PATENT DOCUMENTS

EP   1118953 A2   7/2001

OTHER PUBLICATIONS

Ken Belson and Moon Ihlwan, "Samsung: Defying the Skeptics: The company's online trading ventures are showing promise. Profits are next", Business Week, new York: Aug. 6, 2001, Iss. 3744, p. EB26.

(Continued)

*Primary Examiner* — Jackie Zuniga Abad
(74) *Attorney, Agent, or Firm* — Spencer Fane LLP; Steven J. Laureanti

(57) ABSTRACT

A method for filtered peer-to-peer business communication in a distributed computer environment includes accessing offers associated with one or more offerors and requests associated with one or more requestors, each offer and each request including a set of filter components. Filter components of offers are compared with corresponding filter components of requests to determine whether one or more offers match one or more requests. A match is determined between an offer and a request if the filter components of the offer match the corresponding filter components of the request. In response, at least a matching portion of the offer and request is replicated and communicated to both the offeror associated with the offer and the requestor associated with the request to provide filtered peer-to-peer communication between the offeror and requestor.

20 Claims, 6 Drawing Sheets

(51) Int. Cl.
*G06Q 30/02* (2012.01)
*G06Q 30/06* (2012.01)
*G06Q 40/04* (2012.01)
*H04L 29/08* (2006.01)

(52) U.S. Cl.
CPC ......... *G06Q 10/103* (2013.01); *G06Q 10/107* (2013.01); *G06Q 30/0257* (2013.01); *G06Q 30/0611* (2013.01); *G06Q 40/04* (2013.01); *H04L 67/104* (2013.01)

(58) Field of Classification Search
CPC .... G06Q 10/02; G06Q 10/025; G06Q 10/103; H04L 67/104
See application file for complete search history.

(56) References Cited

U.S. PATENT DOCUMENTS

| | | | |
|---|---|---|---|
| 6,098,051 | A | 8/2000 | Lupien et al. |
| 6,578,014 | B1 | 6/2003 | Murcko, Jr. |
| 6,580,916 | B1 | 6/2003 | Weisshaar et al. |
| 6,598,026 | B1 | 7/2003 | Ojha et al. |
| 6,618,593 | B1 | 9/2003 | Drutman et al. |
| 6,901,367 | B1 | 5/2005 | Berstis et al. |
| 6,934,702 | B2 | 8/2005 | Faybishenko et al. |
| 7,043,531 | B1 | 5/2006 | Seibel et al. |
| 7,861,252 | B2 | 12/2010 | Uszok et al. |
| 2002/0091833 | A1* | 7/2002 | Grimm ............ G06F 9/5027 709/227 |

OTHER PUBLICATIONS

Anonymous, "Jibe Launches First Peer-to-Peer Solution for Supplier Enablement", available at http://www.jibeinc.com/aboutJibe/press_82201.htm (last visited Feb. 7, 2002). Aug. 22, 2001.

Anonymous, "Jibe Core Technology", available at http://jibeinc.com/technology/index.htm. Feb. 7, 2002.

Anonymous, "Jibe Data Sharing", available at http://jibeinc.com/solutions/EnterpriseDataSharing.htm. Feb. 7, 2002.

Anonymous, "Jibe File Sharing", available at http://jibeinc.com/solutions/EnterpriseFileSharing.htm. Feb. 7, 2002.

Anonymous, "Jibe Introduces File Sharing Solution for the Enterprise at Gartner IT Expo", available at http://jibeinc.com/aboutJibe/press_100301.htm. Feb. 7, 2002.

Scarlata, V.; Levine, B. N.; Shields, C.: "Responder anonymity and anonymous peer-to-peer file sharing"; IEEE 2001; Ninth International Conference on Network Protocols; DOI: 10.1109/ICNP.2001.992907; Publication Year: 2001, pp. 272-280.

McLaren, B.M., Hayes, P.J.; McKenna A.J.: "Intelligent trading networks: Peer-to-peer trading in a distribution marketplace"; CSREA Press; Proceedings of the International Conference on Internet Computing (IC-2001). Las Vegas, Nevada, ISBN 1-89251-283-1; Jun. 25-28, 2001. pp. 764-771.

* cited by examiner

FIG. 5

FILTERED PEER-TO-PEER BUSINESS COMMUNICATION IN A DISTRIBUTED COMPUTER ENVIRONMENT

CROSS-REFERENCE TO RELATED APPLICATIONS

This application is a continuation of U.S. patent application Ser. No. 11/876,483 filed Oct. 22, 2007 and entitled "FILTERED PEER-TO-PEER BUSINESS COMMUNICATION IN A DISTRIBUTED COMPUTER ENVIRONMENT", now U.S. Pat. No. 9,224,109, which is a continuation of U.S. patent application Ser. No. 10/059,645 filed on 28 Jan. 2002 and entitled "FILTERED PEER-TO-PEER BUSINESS COMMUNICATION IN A DISTRIBUTED COMPUTER ENVIRONMENT", now U.S. Pat. No. 7,386,459. U.S. Pat. Nos. 9,224,109 and 7,386,459 are commonly assigned to the assignee of the present application. The disclosure of related U.S. Pat. Nos. 9,224,109 and 7,386,459 are hereby incorporated by reference into the present disclosure as if fully set forth herein.

TECHNICAL FIELD

This invention relates in general to computer-based business communications, and more particularly to filtered peer-to-peer business communication in a distributed computer environment.

BACKGROUND

Modem communication solutions enable vast quantities of live information to be exchanged within and between enterprises, but there is still a need for increased relevancy to enable parties to interact with only the information they actually need to effectively communicate with their peers. The large volume of information typically encountered on a daily basis can result in an overwhelming quantity of information through which to filter. The onslaught of information typically results in much of the information being stored to be processed, if at all, at a later time rather than the flow of information being processed as it is received. Consequently, a fraction of received information is seen and eventually processed, a fraction is seen but not fully appreciated and therefore falls through the cracks, and the remainder might never be seen at all. As an example, a large enterprise may generate billions of possible exceptions and decision points per year. Software applications can pull certain of these exceptions and decision points up at the job function or "role" level, but most enterprise applications and business users still encounter poor, unfiltered monitoring and an increasingly disparate set of tools to communicate with other systems within the same or different enterprises. Employees, challenged by the sheer number of competing messages and tasks that cross their workspaces, resist incoming data, and even the relatively few messages that are seen and processed are often insignificant to the task at hand. Loss of valuable information is potentially harmful to an enterprise because such information may concern, for example, the next major client or the next big cost-saver for the enterprise. Enterprises and associated users need an effective way to help ensure that valuable information is seen, prioritized, and addressed rather than being lost among the vast quantity of unimportant information that is also received.

SUMMARY

According to the present invention, disadvantages and problems associated with prior techniques for computer-based business communications may be reduced or eliminated.

In one embodiment of the present invention, a method for filtered peer-to-peer business communication in a distributed computer environment includes accessing offers associated with one or more offerors and requests associated with one or more requestors, each offer and each request including a set of filter components. Filter components of offers are compared with corresponding filter components of requests to determine whether one or more offers match one or more requests. The comparison of filter components includes comparing source components of one or more offers with a source component of a request to determine whether the source components of the offers match the source component of the request, the source component of each offer including information concerning a source of the offer and one or more source requirements for any matching requests, the source component of the request including source information concerning a source of the request and one or more source requirements for any matching offers. The comparison of filter components also includes comparing properties components of the one or more offers with a properties component of the request to determine whether the properties components of the offers match the properties component of the request, the properties component of each offer including information concerning content-related properties of a message being communicated using the offer and one or more content-related property requirements for any matching requests, the properties component of the request including information concerning content-related properties of a message being communicated using the request and one or more content-related property requirements for any matching offers. The comparison of filter components also includes comparing detail components of the one or more offers with a detail component of the request to determine whether the detail components of the offers match the detail component of the request, the detail component of each offer including one or more transmission-related characteristics of the offer and one or more transmission-related characteristic requirements for any matching requests, the detail component of the request including one or more transmission-related characteristics of the request and one or more transmission-related characteristic requirements for any matching offers. The comparison of filter components also includes comparing audience components of the one or more offers with an audience component of the request to determine whether the audience components of the offers match the audience component of the offer, the audience component of each offer including information concerning the intended audience for the offer and one or more audience requirements for any matching requests, the audience component of the request including information concerning the intended audience of the request and one or more audience requirements for any matching offers. A match is determined between an offer and the request if the filter components of the offer match the corresponding filter components of the request. In response, at least a matching portion of the offer and request is replicated and communicated to both the offeror associated with the offer and the requestor associated with the request to provide filtered peer-to-peer communication between the offeror and requestor.

Particular embodiments of the present invention may provide one or more technical advantages. For example, by allowing a party to specify, using one or more filter components of an offer, what a message concerns and to whom the message is intended or to specify, using one or more filter components of a request, what messages the user desires to receive and from whom, the present invention may provide more effective filtering of the large volumes of information confronting parties, allowing them to interact with more useful information. Through the use of filter components, the present invention may provide a uniform set of inputs, and automatically sort these inputs according to their relevancy, solving many of the problems associated with disparate technical integration requirements. Use of filter components may allow employees, Internet services, applications, enterprise systems, and other users to submit offers and requests in the conversational manner by which humans naturally communicate. This may help ensure that useful information is not lost and can receive the attention it warrants.

In certain embodiments, the present invention may provide configurable dynamic user interface (UI) components, or "jukes," which customize a display based on appropriate offers and requests. For example, such jukes may allow a party to define filter components to control which incoming messages associated with offers and requests appear or are otherwise reflected in a display. Additionally, bandwidth, relevancy, detail, or other controllers for a computer workspace, corresponding to one or more such filter components, may help provide more space, time, and attention conscious UI than presently exists.

In certain embodiments, the present invention may be used to build workflows on top of functional engines. By capturing a sequence of successful events associated with a business process, a party may begin to store and optimize workflows across all the communication and decision points that the business process requires to be successful. A workflow need not necessarily occur within the realm of a single integrated suite of software. In fact, there are many steps of certain workflows that are not handled by software at all, such as human decision points and approvals, physical execution (e.g., fulfillment or manufacture), and the like. By monitoring these activities, and demanding a checkpoint, a party can track their occurrence. Thus, certain embodiments of the present invention may help a party maintain an active workflow through queries and expected responses from transaction engines and databases and through approvals and confirmations from the human and physical elements and other suitable tools.

Systems and methods incorporating one or more of these or other technical advantages may be well suited for modem business communication environments. Certain embodiments of the present invention may provide some, all, or none of the above technical advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 5 illustrates an example dynamic, customizable UI incorporating one or more jukes;

DETAILED DESCRIPTION

Figure 1:
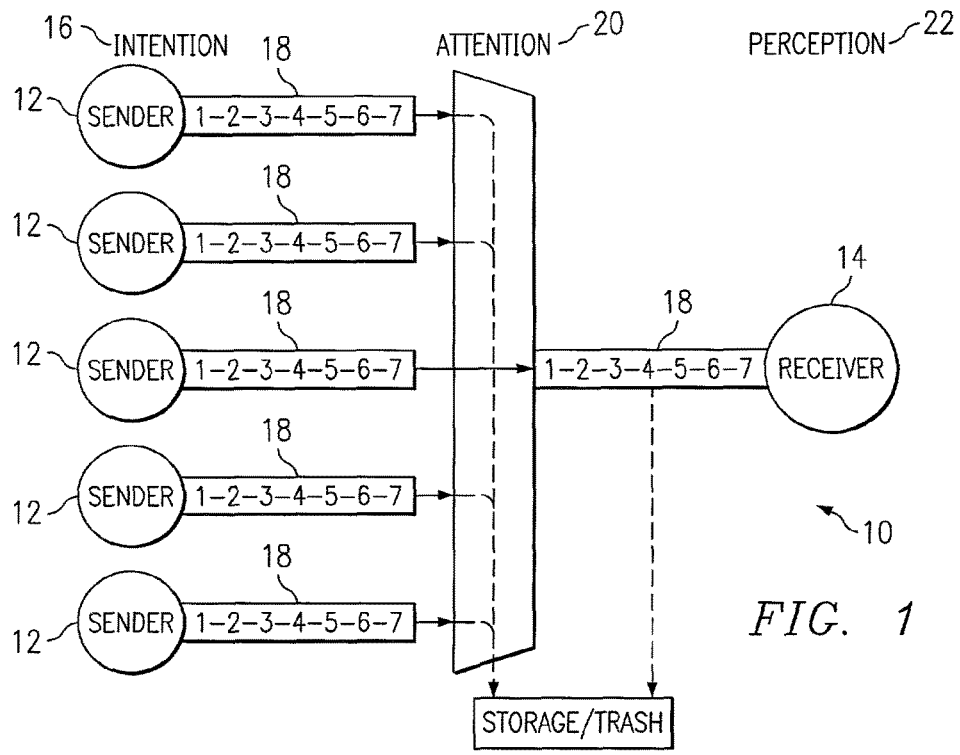
FIG. 1 illustrates an example communication model for one-to-one business communication.

FIG. 1 illustrates an example communication model 10 for one-to-one business communication, which involves a sender 12 and a receiver 14 that must understand each other and devote the time and effort necessary to send and receive full messages to each other. At an intention stage 16, multiple senders 12 each attempt to establish a direct connection with a receiver 14 for an entire sequenced message 18. At an attention stage 20, receiver 14 must manually filter the numerous competing messages 18, typically wastefully storing many messages 18 and unwanted parts of messages 18 for possible later use, while giving few messages 18 serious attention. Lack of serious attention may cause some messages 18 containing valuable information to be deleted or otherwise ignored and the benefit of the information lost. At a perception stage 22, if a message 18 survives attention stage 20, receiver 14 devotes time and attention to process message 18 but, unless receiver 14 disconnects after only a portion of message 18 is processed, receiver 14 is held captive for the entire sequenced message 18.

Communication model 10 may be equated to several, generally wasteful methods of business communication. For example, the "hard sell" situation (one-to-one communication) may involve a sender 12 pushing a product that receiver 14 may not actually be seeking, or sending all detailed data around a transaction when receiver 14 only desires the basics. A "spam" situation (one-to-many communication) may involve a sender 12 broadly releasing messages 18 to receivers 14 that are not interested in receiving those messages 18. A "useless customer" situation (many-to-one communication) may involve a sender 12 wasting support inquiries and business development time directly interacting with invalid or unqualified receivers 14. A "market failure" situation (many-to-many communication) may involve senders 12 failing to recognize the trends and needs of the aggregate market because of distractions associated with individual receivers 14 and microeconomic details.

These examples demonstrate how a crowded bilinear communication channel breaks down when there is not a willingness by both a sender 12 and a receiver 14 to have a dialogue involving the exchange of messages 18. Successful delivery of messages 18 in these situations is often accomplished only through deception. By looking at its operation within or between enterprises, the problems associated with communication model 10 are further highlighted. An enterprise's competitive advantage often lies in its ability to organize, build, and change relationships around its best ideas, as well as those of other enterprises. When groups and hierarchies are changed in enterprises that rely on communication model 10, relationships are broken. An enterprise's ability to flexibly assign responsibilities and workflows to any group or individual without extensive integration may also be limited.

As a whole, the dynamics of the marketplace do not follow the direct communication model 10, but are instead more like a conversation. Senders 12 and receivers 14 that want to interact through a variety of means, including the Internet, will often fail to connect due to the amount of interference caused by senders 12 attempting to directly force messages 18 upon those receivers 14 that (perhaps unknowingly) expose their identity. Receivers 14 would prefer to receive only messages 18 that are likely to have valuable information and are from senders 12 with which receivers 14 wish to interact. For their part, most senders 12 would prefer to specify which receivers 14 should get their messages 18 and how those receivers 14 should respond, such that only receivers 14 suited to appropriately respond to messages 18 receive the messages 18.

Figure 2:
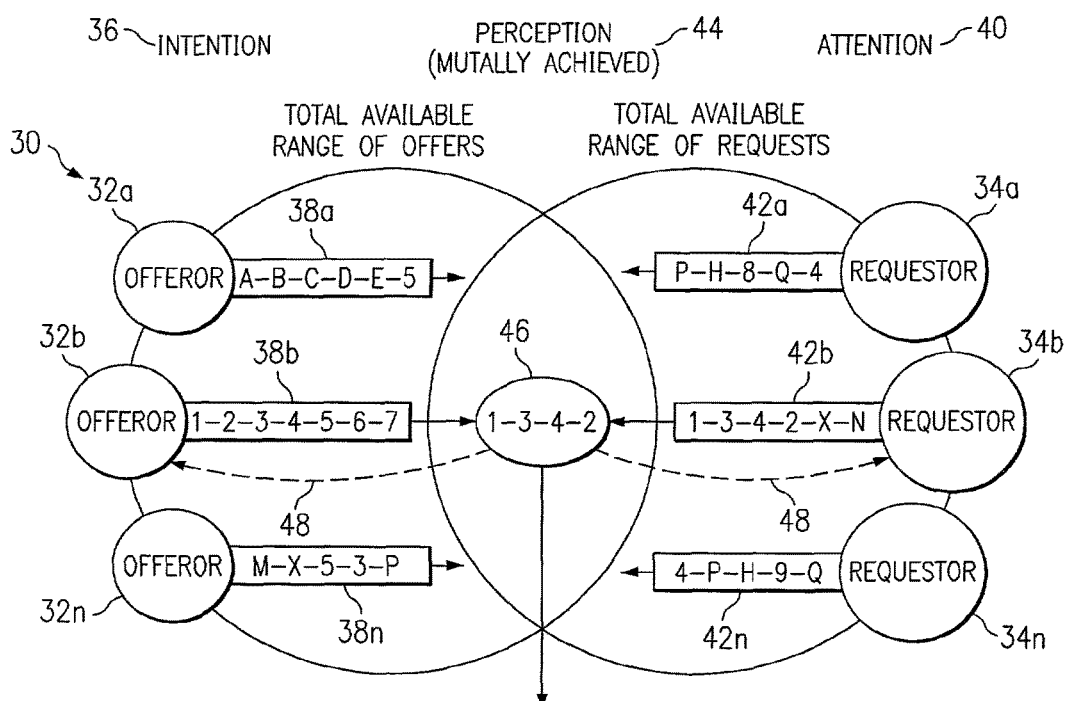
FIG. 2 illustrates an example communication model for filtered peer-to-peer business communication in a distributed computer environment.

FIG. 2 illustrates an example communication model 30 for filtered peer-to-peer business communication In a distributed computer environment. Communication model 30 more closely represents the transmission of successful, demanded messages through a human information network analogous to a conversation among parties. All parties who participate in a conversation will preferably have relatively simple filters that intrinsically define what messages they are communicating (or what messages they are interested in) and to (or from) whom. In communication model 30, these parties include offerors 32 and requestors 34. Where appropriate, reference to an offeror 32 or requestor 34 is meant to encompass one or more associated users, although the present invention contemplates offerors 32 and requestors 34 being wholly or partially autonomous. Although offerors 32 and requestors 34 are described as different parties, offerors 32 and requestors 34 may be associated with the same or different enterprises, and an offeror 32 with respect to one message may be a requestor 34 with respect to another message. In heterogeneous, peer-to-peer environments, offerors 32 and requestors 34 are generally loosely coupled, meaning that they may operate using different platforms and may communicate using different languages and delivery methods.

In one embodiment, communication model 30 includes an intention stage 36 in which offerors 32 transmit offers 38, which may each specify information concerning the associated offeror 32 and generation of offer 38, information associated with the message being communicated (e.g., what information offeror 32 is offering), and information identifying to whom offer 38 is intended (e.g., to whom offeror 32 is offering the information). At an attention stage 40, requestors 34 transmit requests 42, which may each specify information concerning the associated requestor 34 and generation of request 42, information associated with the message being communicated (e.g., what information requestor 34 is seeking), and information identifying to whom request 42 is intended (e.g., from whom requestor 34 is seeking the information). Intention stage 36 and attention stage 40 may have unlimited durations and may occur at any time system 10 is in operation, such that offers 38 and requests 42 are generated more or less continuously, depending of course on the needs and activities of offerors 32 and requestors 34. Although offers 38 and requests 42 can include offers and requests, respectively, in a strict commercial sense, offers 38 and requests 42 are not intended to be so limited. The present invention contemplates an offer 38 including any information being offered for consumption by one or more recipients and contemplates a request 42 including any request for information from one or more sources.

At a perception stage 44, successful matching of offeror 32 and requestor 34 interests, as reflected in corresponding offers 38 and requests 42, respectively, creates successful business collaboration. In the illustrated embodiment, for example, offer 38$b$ from offeror 32$b$ may include non-sequenced content "1-2-3-4-5-6-7" and request 42$b$ from requestor 34$b$ may include non-sequenced content "1-3-4-2-X-N." At perception stage 44, existing offers 38 from one or more offerors 32 are compared with existing requests 42 from one or more requestors 34, for example, at a server system associated with an electronic marketplace, network service provider, or other intervening entity. In this example, a match 46 occurs between the content "1-3-4-2" in request 42$b$ and the content "1-2-3-4" in offer 38$b$ (in this case among other partial matches between certain offers 38 and requests 42). Although exact matches may be required in certain cases, unless otherwise specified the terms "match" and "matching" as used herein are meant to encompass any suitable level of consistency, compatibility, compliance, or agreement. The comparison of offers 38 and requests 42 at the server system is described more fully below with reference to FIG. 4. Offer 38$b$ and request 42$b$ resulting in match 46, representing mutually achieved perception between offeror 32$b$ and requestor 34$b$, may be replicated in whole or in part at the server system and communicated from the server system to offeror 32$b$, requestor 34$b$, or preferably both. For example, as indicated by arrows 48, copies of successfully matched offer 38$b$ and request 42$b$ (or the matched content "1-3-4-2") may be communicated from the server system/to offeror 32$b$ and requestor 34$b$.

Various types of business communication can be achieved according to communication model 30. These communication types may include one-to-one, one-to-many, many-to-one, and many-to-many. Several examples are provided below for purposes of illustration but, as those skilled in the art will appreciate, these examples are not intended to limit the invention to any particular business communication environment.

As an example of one-to-one communication, a financial settlement system (acting as an offeror 32) may send to a server system one or more offers 38 specifically referencing a particular bank transaction system (acting as a requestor 34) in connection with one or more transactions. The bank transaction system may send one or more requests 42 to the server system specifying that the bank transaction system only accepts transaction data from the particular financial settlement system. By strictly defining the offeror 32 and the requestor 34 in this manner, other parties may be prevented from accessing any information within offers 38 or requests 42 concerning the underlying transactions. Both the offeror 32 and requestor 34 can also encrypt the message payloads of the offers 38 and requests 42, in this case the transaction data. Transactions may be considered complete when the offeror 32 and requestor 34 receive copies of successfully matched offers 38 and requests 42 (or matched portions thereof) from the server system.

As an example of one-to-many communication, an enterprise (acting as a requestor 34) may send a request 42 to a server system containing a request for promise (RFP) and specifying that the RFP is intended only for a set of preferred suppliers (acting as offerors 32) who are registered with the enterprise. Multiple suppliers (acting as offerors 32) that have goods to sell may send offers 38 to the server system containing bids and including appropriate identifiers assigned upon registering with the enterprise. After a successful match 46 between request 42 and one or more offers 38, in receiving copies of the successfully matched offer 38 and requests 42 (or matched portions thereof) from the server system, the enterprise may essentially receive a list of suppliers that already meet the requirements of its RFP.

As an example of many-to-one communication, a seller (acting as an offeror 32) may substantially continuously syndicate requests from its catalog and send to the server system corresponding offers 38, representing a supply stream, intended for certain buyers. Buyers (acting as requestors 34) may generate demand signals through their procurement methods of choice and send to the server system requests 42 that request matches from the supply stream represented by offers 38. After a successful match 46 between an offer 38 and a request 42 and receipt of copies of the offer 38 and request 42 (or matched portions thereof), the seller may instantaneously consume the appropriate amount of availability and the buyer may instantaneously initiate an order process, with or without human confirmation.

An example of many-to-many communication may occur within a multi-enterprise design collaboration environment, with each enterprise managing its design processes and sending offers 38 or requests 42 as necessary. Proliferation of ideas and decisions in this manner can, for example, drive the efficient and successful design of a new product. Monitored demand from point of sale, customer feedback, marketing response, testing systems, or other sources may help drive metrics that enhance the design collaboration process.

According to communication model 30, ideas may flow among multiple parties as in a group conversation in which all parties involved in the conversation have the ability to speak and listen to all other parties and in which group dynamics therefore become a factor. In a conversational setting, each party can filter with whom they converse and what they converse about based on common interest. Certain embodiments of the present invention attempt to approximate this ideal by providing filtered peer-to-peer business communication in a distributed computer environment.

Figure 3:
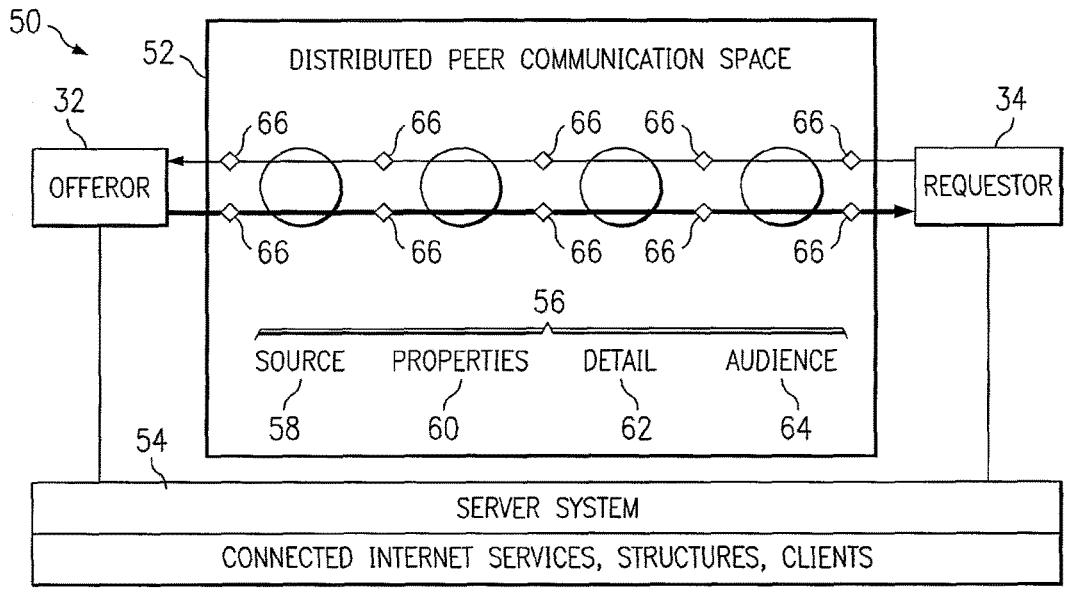
FIG. 3 illustrates an example protocol for filtered peer-to-peer business communication in a distributed computer environment.

FIG. 3 illustrates an example protocol 50 for filtered peer-to-peer business communication in a distributed computer environment. In one embodiment, protocol is used for sharing meta-data by communicating information "particles" over the Internet, according to communication model 30, that can be filtered and then delivered to an appropriate audience. Offers 38 and requests 42 may be viewed as being communicated through a distributed peer communication space 52 associated with server system 54 rather than as directed communications between offerors 32 and requestors 34. In one embodiment, server system 54 handles all message traffic from offerors 32 and requestors 34, in the form of offers 38 and requests 42, respectively. Server system 54 may operate on one or more computers at one or more locations. Server system 54 may include one or more partitions on one or more existing servers or one or more separate servers within the infrastructure of one or more enterprises, such as Hypertext Transfer Protocol (HTTP), File Transfer Protocol (FTP), mail, or other Internet-enabled servers. Each offeror 32 and requestor 34 may be coupled to server system 54 using one or more computer buses, local area networks (LANs), metropolitan area networks (MANs), wide area networks (WANs), portions of a global computer network such as the Internet, or any other wireline, optical, wireless, or other links. Offerors 32 and requestors 34 may leverage a local or remote server system 54 at any suitable point to interact with distributed peer communication space 52. Server system 54 may allocate and maintain a portion of distributed peer communication space 52 for each offeror 32 and requestor 34 registered with server system 54.

Protocol 50 may define a set of filter components 56 communicated within each offer 38 and request 42, in one embodiment including a source component 58, a properties component 60, a detail component 62, and an audience component 64. Filter components 56 within an offer 38 or request 42 may be generated by a user associated with an offeror 32 or a requestor 34, respectively; by a computer system, software application, or other component associated with an offeror 32 or requestor 34, respectively; by server system 54 based at least in part on filter component data or other information received from an offeror 32 or requestor 34, respectively; or in any other suitable manner. For example, server system 54 may receive offers 38 and requests 42 containing filter components 56 but lacking certain filter component data, which server system 54 may then provide. Filter components 56 are preferably sent, received, and processed at server system 54 in a predetermined order that is uniform across all offers 38 and requests 42. Among other benefits, this may help reduce or eliminate problems associated with different technical integration requirements of different offerors 32 and requestors 34. The contents of filter components 56 and the order in which they are processed at server system 54 are discussed in more detail below with reference to FIG. 4. Although particular filter components 56 are described in association with protocol 50, the present invention contemplates any suitable number and types of filter components 56 according to the implementation and particular needs.

In general, operations performed by server system 54 may include receiving offers 38 and requests 42; performing appropriate validations with respect to offers 38 and requests 42; generating appropriate filter component data for offers 38 and requests 42, where not supplied by the associated offerors 32 and requestors 34; comparing filter components 56 to determine matching offers 38 and requests 42; replicating matched offers 38 and requests 42 (or portions thereof); communicating matched offers 38 and requests 42 (or portions thereof) to the associated offerors 32 and requestors 34; deleting offers 38 and requests 42 after suitable processing or after a certain time (e.g., for unmatched offers 38 and requests 42); and any other suitable operations. In addition, software associated with server system 54 may provide powerful multi-dimensional searching and matching technology for active offers 38 and requests 42; profiling on behaviors of offerors 32, requestors 34, and associated groups; advanced reporting and forecasting based on traffic patterns of offers 38 and requests 42; web-based lookup and searching to retrieve externally-stored data referenced in offers 38 and requests 42; archiving suitable data to an appropriate storage location; or any other suitable functionality. Certain embodiments may allow offers 38 and requests 42 to influence each other "magnetically" using interaction paradigms that allow ideas to group or weight themselves as particles along suitable criteria through attraction or repulsion.

Server system 54 may support one or more service registries, which may assure secure, validated identities for all offerors 32, requestors 34, and associated groups. In one embodiment, companies such as VERISIGN, INC. might provide such functionality on a public basis, while specific industries or other interest groups might manage their own service registries in association with server system 54. A service registry may also act as a "scorecarding" system to help evaluate the honesty of an offeror 32 or requestor 34.

Server system 54 may provide one or more translation services. For example, although the filter components 56 of an offer 38 and request 42 may be compatible, the actual language or data format of the underlying message may need translation. Offerors 32 and requestors 34 that subscribe to translation services may use these services to make information available through translation of filter component data or of the underlying messages represented using filter components 56.

In one embodiment, offerors 32 and requestors 34 send what are essentially half-empty data sets to server system 54 within offers 38 and requests 42, respectively. The architecture of offers 38 and requests 42 may be no different; both offerors 32 and requestors 34 are senders of messages. Offeror 32 sends an offer 38 to server system 54 containing certain filter component data and seeking one or more requests 42 with matching filter component data to complete the associated data set. Similarly, requestor 34 sends a request 42 to server system 54 containing certain filter component data and seeking one or more offers 38 with matching filter component data to complete the associated data set. If an appropriate set, preferably all, of filter components 56 are consistent, compatible, in compliance, in agreement, or otherwise match sufficiently between an offer 38 and a request 42, a match 46 occurs and some or all of the completed data set is replicated and communicated from server system 54 to both the offeror 32 and requestor 34.

Filter components 56 may be considered a set of "parliamentary procedures" 25 for business interaction that are built into the communicated offers 38 and requests 42 themselves. Protocol 50 places responsibility and accountability on both offerors 32 and requestors 34 to make offers 38 and requests 42 connect. In one embodiment, as discussed above, when processed in an appropriate order at server system 54, filter components 56 implement a process of business collaboration modeled after an idealized human conversational process. When offers 38 and requests 42 are communicated by offerors 32 and requestors 34, respectively, the parties can be viewed as engaging in a conversation through distributed peer communication space 52, which in one embodiment can be considered a synaptic network.

Each filter component 56 may include certain meta-data communicated with and concerning the associated offer 38 or request 42. For example, source component 58 may include meta-data specifying time, type, source, identity, or any other suitable source information. Properties component 60 may include meta-data specifying protocol, language, properties, priority, or any other suitable properties information. Detail component 62 may include meta-data specifying platform, bandwidth, size, detail, order, or any other suitable detail information. Audience component 64 may include meta-data specifying groups, parties, state, proximity, urgency, or any other suitable audience information. Filter components 56 may provide a way to communicate meta-data using references to external information sources, web-based services, or any other suitable external resources. More detailed example meta-data for each filter component 56 is described in more detail below with reference to FIG. 4.

Protocol 50 may overlay any appropriate communications protocol suitable for computer-to-computer communications. The message communicated in an offer 38 or request 42 can be in any appropriate language or format. The message may be embedded in one or more of filter components 56 of an offer 38 or request 52 or may be external to and referenced by the offer 38 or request 42. Since there is typically a limited amount of data that can be communicated as a message within an offer 38 or request 42 due to packet size, bandwidth, or other physical constraints, more detailed information associated with a message may be stored at a suitable external location and referenced rather than being communicated in the offer 38 or request 42 itself. In one embodiment, however, protocol 50 does require the specification of certain filter component data within an offer 38 or request 42 for each filter component 56.

Protocol 50 may define one or more security, filtering, or other checkpoints 66 preceding and/or succeeding each filter component 56. Server system 54 may perform checkpoints 66, for example, to filter unwanted offers 38 and requests 42, compare offers 38 with requests 42, and prevent unwanted or interfering replication of offers 38 and requests 42. Server system 54 may also use checkpoints 66 to help ensure the validity, accuracy, and intent of the information communicated in offers 38 and requests 42 and to help ensure the accountability of the parties. Checkpoints 66 and their use in association with protocol 50 are discussed in more detail below with reference to FIG. 4.

Figure 4:
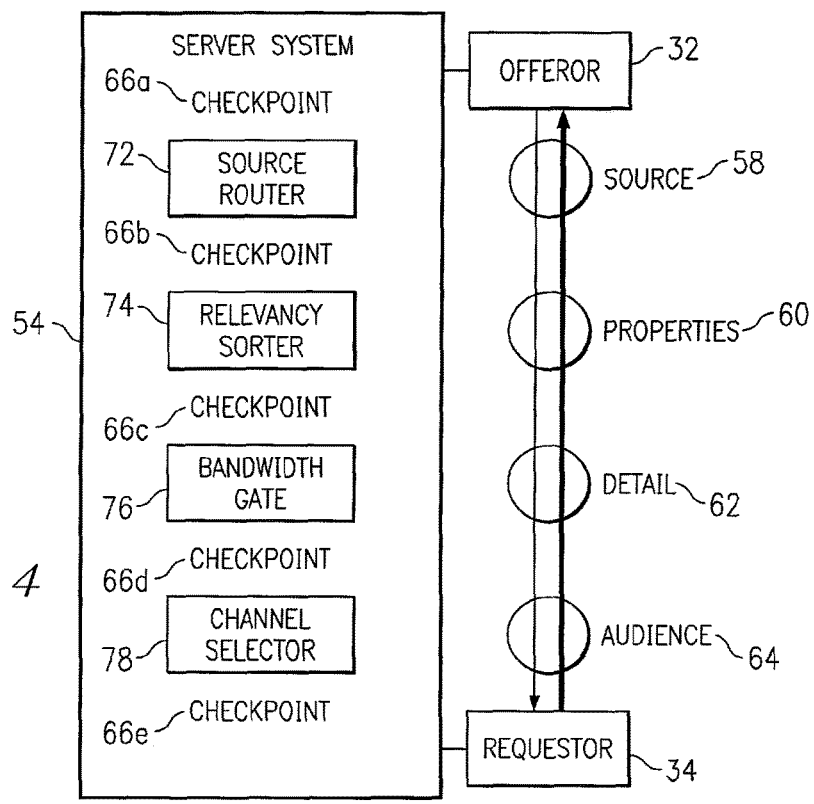
FIG. 4 illustrates an example server system for implementing a protocol for filtered peer-to-peer business communication.

FIG. 4 illustrates an example server system 54 that implements protocol 50 to support filtered peer-to-peer business communication in a distributed computer environment. In one embodiment, server system 54 includes a source router 72, a relevancy sorter 74, a bandwidth gate 76, and a channel selector 78. Although these elements are given particular names for purposes of illustration, the present invention contemplates the described functionality being provided by any suitable component or components, regardless of the names given such components. An example set of filter components 56 and associated meta-data for an offer 38 and a request 42, and their example processing at server system 54, are set forth below. This example data model is used to illustrate the limited set of data that, in particular embodiments, may be communicated in an offer 38 or request 42. Deeper, more detailed, or other additional information may, if not included in an offer 38 or request 42, be stored at a suitable external location and referenced by offer 38 or request 42, as described above.

Example Offer and Processing

In one embodiment, the filter components 56 for an offer 38 are transmitted in the order described below. However, the present invention contemplate any suitable order according to particular needs.

<Checkpoint 66a>

Checkpoint 66a may involve decision criteria that must be satisfied before offer 38 is launched into the distributed peer communication space 52 associated with server system 54 for comparison with requests 42. For example, this may involve validation of system, software, or other technical properties of offeror 32 and validation of certain aspects of offer 38. Validation may occur entirely at server system 54 or at least in part by systems, applications, firewalls, or other structures of offeror 32. Thus, in certain embodiments, performance of checkpoint 66a may be distributed between offeror 32 and server system 54. In one embodiment, creation of all filter components 56 for offer 38 occurs at checkpoint 66a based at least in part on filter component data specified by offeror 32.

Source Component 58:

Source component 58 may include one or more of the following fields, in any suitable order, in any suitable combination, and without limitation:

<Time> This field may indicate the date and time offer 38 was sent by offeror 32 or otherwise initiated, for example, by communication of filter component data from offeror 32 to server system 54. The date and time are preferably entered automatically at offeror 32 and are not fakeable. Server system 54 may automatically reject non-instantaneous or other offers 38 received from offerors 32 based on the information in this field.

<Type> This field may specify one of any number of user-specified or other options for the type of transmission (e.g., static, automatic, system, personal, etc.). The specified type may depend on the reason offer 38 was sent. Dishonesty as to the information in this field may cause server system 54 to restrict or downgrade offeror 32 to avoid "spam."

<Source> This field may specify domain and source registries of offeror 32, entered automatically at offeror 32 or by server system 54 upon creation of source component 58.

<Identity> This field may specify the personal, system, or other identity of offeror 32 to help distinguish between human, system, or other generated messages.

<Address1> Source component 58 may include a field specifying a syndication tag referencing one or more outgoing or incoming external information sources. This field may also specify whether a response is required (e.g., 0=no response, 1=response), perhaps according to one or more rules.

<Checkpoint 66b>

In one embodiment, source router 72 performs checkpoint 66b, if set, by checking source component 58 of offer 38 against source components 58 of one or more requests 42 with which offer 38 is being compared. This may involve checking source information concerning offer 38, specified in source component 58 of offer 38, against source requirements for any matching offers 38, specified in source components 58 of requests 42. Similarly, this may also involve checking source requirements for any matching requests 42, specified in source component 58 of offer 38, against source information concerning requests 42, specified in source components 58 of requests 42. Source router 72 may execute any applicable security, relevancy, or other filters associated with checkpoint 66b. Source router 72 may also execute one or more traffic monitors to identify movement or behavior of offer 38 or a portion thereof (e.g., first packet).

Properties Component 60:

Properties component 60 may include one or more of the following fields, in any suitable order, in any suitable combination, and without limitation:

<Protocol> This field may specify a protocol for offer 38 such as, for example, Hypertext Markup Language (HTML), Extensible Markup Language (XML), Simple Object Access Protocol (SOAP), Universal Description, Discovery, and Integration (UDDI), or any other suitable protocol. If no protocol is specified, this field may default to, for example, XML HTTP.

<Language> This field may specify the language used in offer 38. This field may require the same set of languages between offer 38 and any matching request 42, may refer to an appropriate translation engine within or external to server system 54, or may default to English or any other appropriate language if no language is specified.

<Properties> This field may specify certain meta-properties of offer 38, tagged in simple text, as XML, or as other tagged properties. In one embodiment, this field provides a text repository for basic information about the underlying message being communicated using offer 38. Each meta-property is preferably numbered and named. Meta-properties may be processed at server system 54 or presented to a user associated with a matching request 42 in the order they are transmitted, by default or otherwise.

<Priority> This field may specify priorities associated with meta-properties described above. If set to null, priorities may default to the order in which meta-properties are transmitted or another appropriate order. For example, the meta properties of an HTML page may appear in the order they might be presented within a browser window to a user associated with a matching request 42.

<Address2> Properties component 60 may include a field specifying a syndication tag referencing one or more outgoing or incoming external information sources.

<Checkpoint 66c>

In one embodiment, relevancy sorter 74 performs checkpoint 66c, if set, by checking properties component 60 of offer 38 against properties components 60 of one or more requests 42 with which offer 38 is being compared. This may involve checking properties information concerning offer 38, specified in properties component 60 of offer 38, against properties requirements for any matching offers 38, specified in properties components 60 of requests 42. Similarly, this may also involve checking properties requirements for any matching requests 42, specified in properties component 60 of offer 38, against properties information concerning requests 42, specified in properties components 60 of requests 42. One or more associated matching engines may be used to define and enforce relevancy requirements specified in properties components 60. Relevancy sorter 74 may execute any applicable security, relevancy, or other filters associated with checkpoint 66c.

Detail Component 62:

Detail component 62 may include one or more of the following fields, in any suitable order, in any suitable combination, and without limitation:

<Platform> This field may specify one or more platform-specific tags or links for offeror 32, entered by the user or entered automatically at offeror 32 or by sever system 54 upon creation of detail component 62.

<Bandwidth> This field may specify any required bandwidth or other connection speed and capacity requirements for offer 38.

<Size> This field may specify the total estimated size of offer 38, in terms of bytes, packets, or otherwise. In one embodiment, offeror 32 may specify a minimum size and provide a link to an alternative offer 38 if default size reduction is not possible.

<Detail> This field may set the default number of meta-properties that will be displayed to a user associated with a matching request 42.

<Order> This field may specify the order in which meta-properties will be displayed to a user associated with a matching request 42 and, in certain embodiments, may default to the order in which the properties are transmitted within offer 38.

<Address3> Detail component 62 may include a field specifying a syndication tag referencing one or more outgoing or incoming external information sources.

<Checkpoint 66d>

In one embodiment, bandwidth gate 76 performs checkpoint 66d, if set, by checking detail component 62 of offer 38 against detail components 62 of one or more requests 42 with which offer 38 is being compared. This may involve checking detail information concerning offer 38, specified in detail component 62 of offer 38, against detail requirements for any matching offers 38, specified in detail components 62 of requests 42. Similarly, this may also involve checking detail requirements for any matching requests 42, specified in detail component 62 of offer 38, against detail information concerning requests 42, specified in detail components 62 of requests 42. One or more associated matching engines may be used to define and enforce bandwidth or other speed or capacity requirements specified in detail components 62. Bandwidth gate 76 may execute any applicable security, relevancy, or other filters associated with checkpoint 66d.

Audience Component 64:

Audience component 64 may include one or more of the following fields, in any suitable order, in any suitable combination, and without limitation:

<Groups> This field may specify a list of one or more groups of requestors 34 to which offer 38 is intended. In one embodiment, the list may be prioritized and may include links to registered entities.

<Parties> This field may specify a list of one or more particular requestors 34 for which offer 38 is intended. For example, specifying an Internet Protocol (IP) address may be sufficient to specify a requestor 34 in certain embodiments.

<State> This field may specify the allowability of active versus stored or passive requestors 34. For example, certain offers 38 may require immediate response, such that the allowed state of a requestor 34 is critical.

<Proximity> This field may set the geographic or time proximity of acceptable requestors 34 or requests 42, respectively. For example, when the geographic proximity of a requestor 34 is outside a specified range, matching of offer 38 with request 42 may be disallowed. Similarly, when the time proximity of a request 42 is outside a specified range, matching offer 38 with request 42 may be disallowed.

<Specificity> This field may specify subjective metrics that allow requestor 34 to require certain interest properties on the part of offeror 32, for example, according to a real number scale from zero to one (e.g., 0=any requestor 34, 0.5=only requestors 34 in a certain audience, 1=only a particular requestor 34). Repeated input of "1" may be reflected on traffic reports for offeror 32, which may cause server system 54 and/or requestors 34 to restrict or downgrade offeror 32 as a habitual "spammer."

<Urgency> This field may specify the urgency of offer 38 (e.g., 0=FYI or static information, 1=urgent). Repeated input of "1" may be reflected on traffic reports for offeror 32, which may cause server system 54 and/or requestors 34 to restrict or downgrade offeror 32 as habitually "crying wolf."

<Address4> Audience component 64 may include a field specifying a syndication tag referencing one or more outgoing or incoming external information sources. For example, this field may reference an external source to check for valid requestors 34.

<Checkpoint 66e>

In one embodiment, channel selector 78 performs checkpoint 66e, if set, by checking audience component 64 of offer 38 against audience components 64 of one or more requests 42 with which offer 38 is being compared. This may involve checking audience information concerning offer 38, specified in audience component 64 of offer 38, against audience requirements for any matching offers 38, specified in audience components 64 of requests 42. Similarly, this may also involve checking audience requirements for any matching requests 42, specified in audience component 64 of offer 38, against audience information concerning requests 42, specified in audience components 64 of requests 42. One or more associated matching engines may be used to define and enforce audience requirements specified in audience components 64, taking into account more sophisticated information than, for example, the protocol used for a request 42. Channel selector 78 may execute any applicable security, relevancy, or other filters associated with checkpoint 66e.

Example Request and Processing

In one embodiment, the filter components 56 for a request 42 are transmitted in reverse order relative to the order, described above, in which filter components 56 for an offer 38 are transmitted. As a result, when an offer 38 and a request 42 are considered as logically overlapping in server system 54 (e.g., as shown in FIG. 3), source component 58 of offer 38 may be readily compared to source component 58 of request 42, properties component 60 of offer 38 may be readily compared to properties component 60 of request 42, and so on.

<Checkpoint 66e>

In one embodiment, channel selector 78 performs checkpoint 66e, if set, by checking audience component 64 of request 42 against audience components 64 of one or more offers 38 with which request 42 is being compared. This may involve checking audience information concerning request 42, specified in audience component 64 of request 42, against audience requirements for any matching requests 42, specified in audience components 64 of offers 38. Similarly, this may also involve checking audience requirements for any matching offers 38, specified in audience component 64 of request 42, against audience information concerning offers 38, specified in audience components 64 of offers 38. One or more associated matching engines may be used to define and enforce audience requirements specified in audience components 64, taking into account more sophisticated information than, for example, the protocol used for an offer 38. Channel selector 78 may execute any applicable security, relevancy, or other filters associated with checkpoint 66e.

Audience Component 64:

Audience component 64 may include one or more of the following fields, in any suitable order, in any suitable combination, and without limitation:

<Groups> This field may specify a list of one or more groups of offerors 32 to which request 42 is intended. In one embodiment, the list may be prioritized and may include links to registered entities.

<Parties> This field may specify a list of one or more particular offerors 32 for which request 42 is intended. For example, specifying an IP address may be sufficient to specify an offeror 32 in certain embodiments.

<State> This field may specify the allowability of active versus stored or passive offerors 32. For example, certain requests 42 may require immediate response, such that the allowed state of an offeror 32 is critical.

<Proximity> This field may set the geographic or time proximity of acceptable offerors 32 or offers 38, respectively. For example, when the geographic proximity of an offeror 32 is outside a specified range, matching of request 42 with offer 38 may be disallowed. Similarly, when the time proximity of an offer 38 is outside a specified range, matching request 42 with offer 38 may be disallowed.

<Specificity> This field may specify subjective metrics that allow offeror 32 to require certain interest properties on the part of requestor 34, for example, according to a real number scale from zero to one (e.g., 0=any offeror 32, 0.5=only offerors 32 in a certain audience, 1=only a particular offeror 32). Repeated input of "1" may be reflected on traffic reports for requestor 34, which may cause server system 54 and/or offerors 32 to restrict or downgrade requestor 34 as a habitual "spammer."

<Urgency> This field may specify the urgency of request 42 (e.g., 0=FYI or static information, 1=urgent). Repeated input of "1" may be reflected on traffic reports for requestor 34, which may cause server system 54 and/or offerors 32 to restrict or downgrade requestor 34 as a habitual "spammer."

<Address4> Audience component 64 may include a field specifying a syndication tag referencing one or more outgoing or incoming external information sources. For example, this field may reference an external source to check for valid offerors 32.

<Checkpoint 66d>

In one embodiment, bandwidth gate 76 performs checkpoint 66d, if set, by checking detail component 62 of request 42 against detail components 62 of one or more offers 38 with which request 42 is being compared. This may involve checking detail information concerning request 42, specified in detail component 62 of request 42, against detail requirements for any matching requests 42, specified in detail components 62 of offers 38. Similarly, this may also involve checking detail requirements for any matching offers 38, specified in detail component 62 of request 42, against detail information concerning offers 38, specified in detail components 62 of offers 38. One or more associated matching engines may be used to define and enforce bandwidth or other speed or capacity requirements specified in detail components 62. Bandwidth gate 76 may execute any applicable security, relevancy, or other filters associated with checkpoint 66d.

Detail Component 62:

Detail component 62 may include one or more of the following fields, in any suitable order, in any suitable combination, and without limitation:

<Platform> This field may specify one or more platform-specific tags or links for requestor 34, entered by the user or entered automatically at requestor 34 or by server system 54 upon creation of detail component 62.

<Bandwidth> This field may specify any required bandwidth or other connection requirements for request 42.

<Size> This field may specify the total estimated size of request 42, in terms of bytes, packets, or otherwise. In one embodiment, requestor 34 may specify a minimum size and provide a link to an alternative request 42 if default size reduction is not possible.

<Detail> This field may set the default number of meta-properties that will be displayed to a user associated with a matching offer 38.

<Order> This field may specify the order in which meta-properties will be displayed to a user associated with a matching offer 38 and, in certain embodiments, may default to the order in which the properties are transmitted within request 42.

<Address3> Detail component 62 may include a field specifying a syndication tag referencing one or more outgoing or incoming external information sources. This field may reference external sources.

<Checkpoint 66c>

In one embodiment, relevancy sorter 74 performs checkpoint 66c, if set, by checking properties component 60 of request 42 against properties components 60 of one or more offers 38 with which request 42 is being compared. This may involve checking properties information concerning request 42, specified in properties component 60 of request 42, against properties requirements for any matching requests 42, specified in properties components 60 of offers 38. Similarly, this may also involve checking properties requirements for any matching offers 38, specified in properties component 60 of request 42, against properties information concerning offers 38, specified in properties components 60 of offers 38. One or more associated matching engines may be used to define and enforce relevancy requirements specified in properties components 60. Relevancy sorter 74 may execute any applicable security, relevancy, or other filters associated with checkpoint 66c.

Properties Component 60:

Properties component 60 may include one or more of the following fields, in any suitable order, in any suitable combination, and without limitation:

<Protocol> This field may specify a protocol for request 42 such as, for example, HTML, XML, SOAP, UDDI, or any other suitable protocol. If no protocol is specified, this field may default to, for example, XML over HTTP.

<Language> This field may specify the language used in request 42. This field may require the same set of languages between request 42 and any matching offer 38, may refer to an appropriate translation engine within or external to server system 54, or may default to English or any other appropriate language if no language is specified.

<Properties> This field may specify certain meta-properties of request 42, tagged in simple text, as XML, or as other tagged properties. In one embodiment, this field provides a text repository for basic information about the underlying message being communicated using request 42. Each meta-property is preferably numbered and named. Meta-properties may be processed at server system 54 or presented to a user associated with a matching offer 38 in the order they are transmitted, by default or otherwise.

<Priority> This field may specify priorities associated with meta-properties discussed above. If set to null, priorities may default to the order in which meta-properties are transmitted or another appropriate order. For example, the meta-properties of an HTML page may appear in the order they might be presented within a browser window to a user associated with a matching offer 38.

<Address2> Properties component 60 may include a field specifying a syndication tag referencing one or more outgoing or incoming external information sources.

<Checkpoint 66b>

In one embodiment, source router 72 performs checkpoint 66b, if set, by checking source component 58 of request 42 against source components 58 of one or more offers 38 with which request 42 is being compared. This may involve checking source information concerning request 42, specified in source component 58 of request 42, against source requirements for any matching requests 42, specified in source components 58 of offers 38. Similarly, this may also involve checking source requirements for any matching offers 38, specified in source component 58 of request 42, against source information concerning offers 38, specified in source components 58 of offers 38. Source router 72 may execute any applicable security, relevancy, or other filters associated with checkpoint 66b. Source router 72 may also execute one or more traffic monitors to identify movement or behavior of request 42 or a portion thereof (e.g., first packet).

Source Component 58:

Source component 58 may include one or more of the following fields, in any suitable order, in any suitable combination, and without limitation:

<Time> This field may indicate the date and time request 42 was sent by requestor 42 or otherwise initiated, for example, communication of filter component data from requestor 34 to server system 54. The date and time are preferably entered automatically at requestor 34 and are not fakeable. Server system 54 may automatically reject non-instantaneous or other requests 42 received from requestors 34 based on the information in this field.

<Type> This field may specify one of any number of user-specified or other options for the type of transmission (e.g., static, automatic, system, personal, etc.). The specified type may depend upon the reason request 42 was sent. Dishonesty as to the information in this field may cause server system 54 to restrict or downgrade requestor 34 to avoid "spam."

<Source> This field may specify domain and source registries of requestor 34, entered automatically at requestor 34 or by server system 54 upon creation of source component 58.

<Identity> This field may specify the personal, system, or other identity of requestor 34 to help distinguish between human, system, or other generated messages.

<Address1> Source component 58 may include a field specifying a syndication tag referencing one or more outgoing or incoming external information sources. This field may also specify whether a response is required (e.g., 0=no response, 1=response), perhaps according to one or more rules.

<Checkpoint 66*a*>

Checkpoint 66*a* may involve decision criteria that must be satisfied before request 42 is launched into the distributed peer communication space 52 associated with server system 54 for comparison with offers 38. For example, this may involve validation of system, software, or other technical properties of requestor 34 and validation of certain aspects of request 42. Validation may occur entirely at server system 54 or at least in part by systems, applications, firewalls, or other structures of requestor 34. Thus, in certain embodiments, performance of checkpoint 66*a* may be distributed between requestor 34 and server system 54. In one embodiment, creation of all filter components 56 for request 42 occurs at checkpoint 66*a* based at least in part on filter component data specified by requestor 34.

In one embodiment, in filtering offers 38, server system 54 preferably gives priority to filter components 56 of requests 42 according to the order in which filter components 56 appear in requests 42. For example, given the filter component order described above, matching audience components 64 in offers 38 may be given more weight than matching detail components 62 in offers 38 in determining whether offers 38 match request 42 or in determining the order in which to present matching offers 38 to requestor 34. Any matching offers 38 may be associated with request 42 in the order of their priority. Similarly, but preferably only if settings of requests 42 allow, server system 54 may give priority to filter components 56 of offers 38 according to the order in which filter components 56 appear in offers 38. For example, given the filter component order described above, matching source components 58 in requests 42 may be given more weight than matching properties components 60 in requests 42 in determining whether requests 42 match offer 38 or in determining the order in which to present matching requests 42 to offeror 32. Any matching requests 42 may be associated with offer 38 in the order of their priority.

Figure 5:
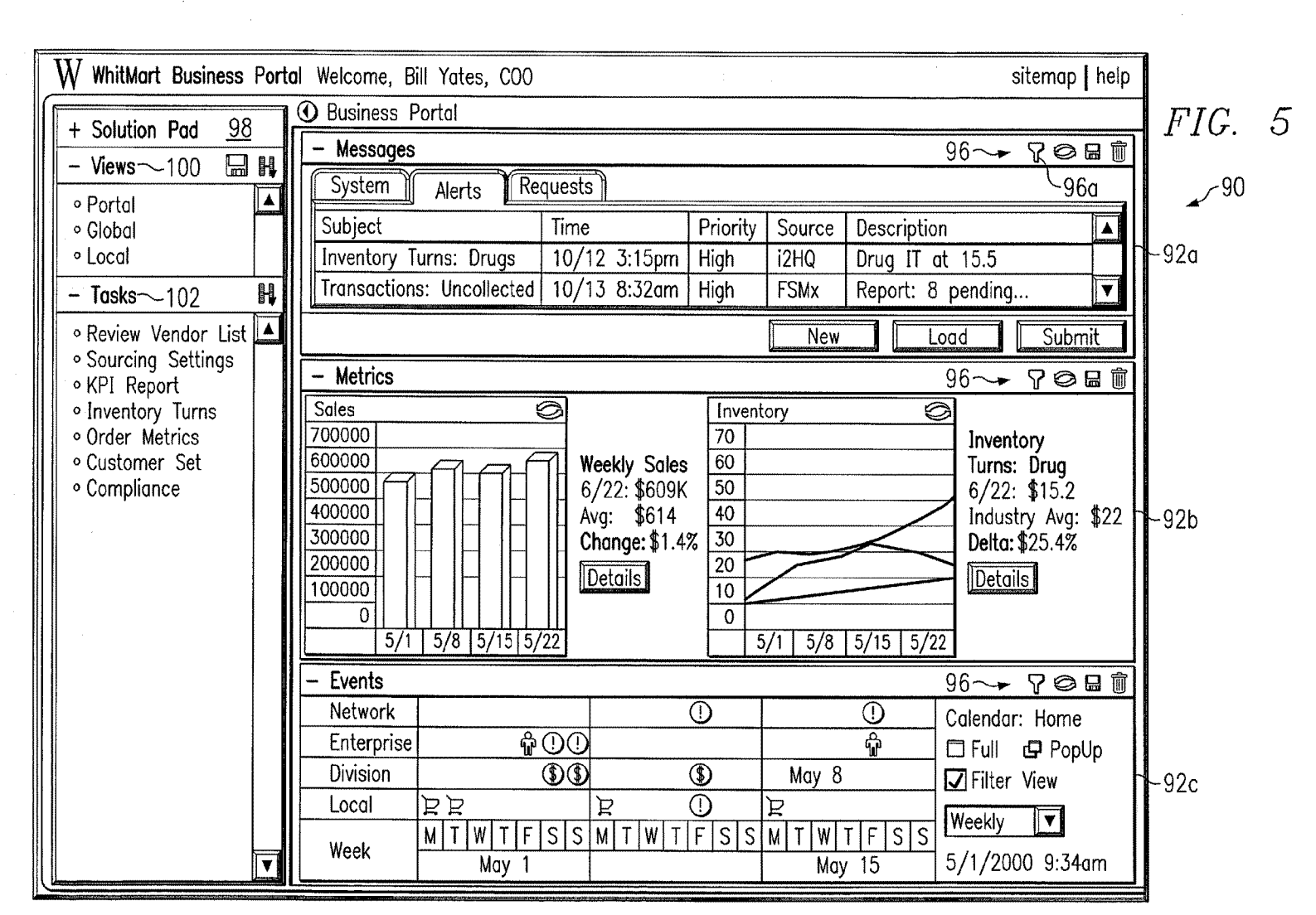

Certain embodiments of the present invention may allow dynamic, customizable user interfaces (UIs) to be built upon the distributed peer-to-peer communication architecture described above. FIG. 5 illustrates an example dynamic, customizable user interface 90 that includes one or more jukes 92. In the illustrated example, jukes 92 include a messages juke 92*a*, a metrics juke 92*b*, and an events juke 92*c*, although anyone or more jukes 92 may be incorporated in UI 90 according to particular needs. Jukes 92 may provide controls 96 associated with any or all filter components 56 defined in protocol 50, such as those described above, where jukes 92 interpret and present these controls 96 to display data and provide input opportunities consistent with protocol 50. For example, controls 96 associated with each juke 92 may be used to control settings of any number and combination source components 58, properties components 60, detail components 62, and audience components 64. As a more particular example, a simple slider bar (not shown) could be displayed within UI 90 in response to the user selecting a funnel icon 96*a* associated with messages juke 92*a*, to allow the user to increase or decrease the number or detail of messages displayed. Through jukes 92, UI 90 may act as a final filter between the various applications, services, or other information sources to which an enterprise subscribes or is otherwise exposed and what users associated with that enterprise need for their daily tasks.

In one embodiment, UI 90 does not have a hard-coded layout, instead being dynamic and customizable according to particular needs. Certain services may be "hidden" by UI 90, such that UI 90 may only present limited information to the user according to the user's role. In one embodiment, jukes 92 may be described as "UI players," containing only essential filtered information and meta-controls the user needs at any step in an applicable workflow. In certain embodiments, UI 90 itself has certain latent properties that it may enforce upon incoming data. These latent properties may relate to space allocations, bandwidth, arrangement of elements, or any other appropriate latent properties. User settings may limit or take precedence over the layout settings of incoming messages, where appropriate. UI 90 may include, for example, a solution pad 98 to allow recall of saved views 100 associated with jukes 92 or saved sequences of workflow interactions or other tasks 102 associated with jukes 92.

Figure 6:
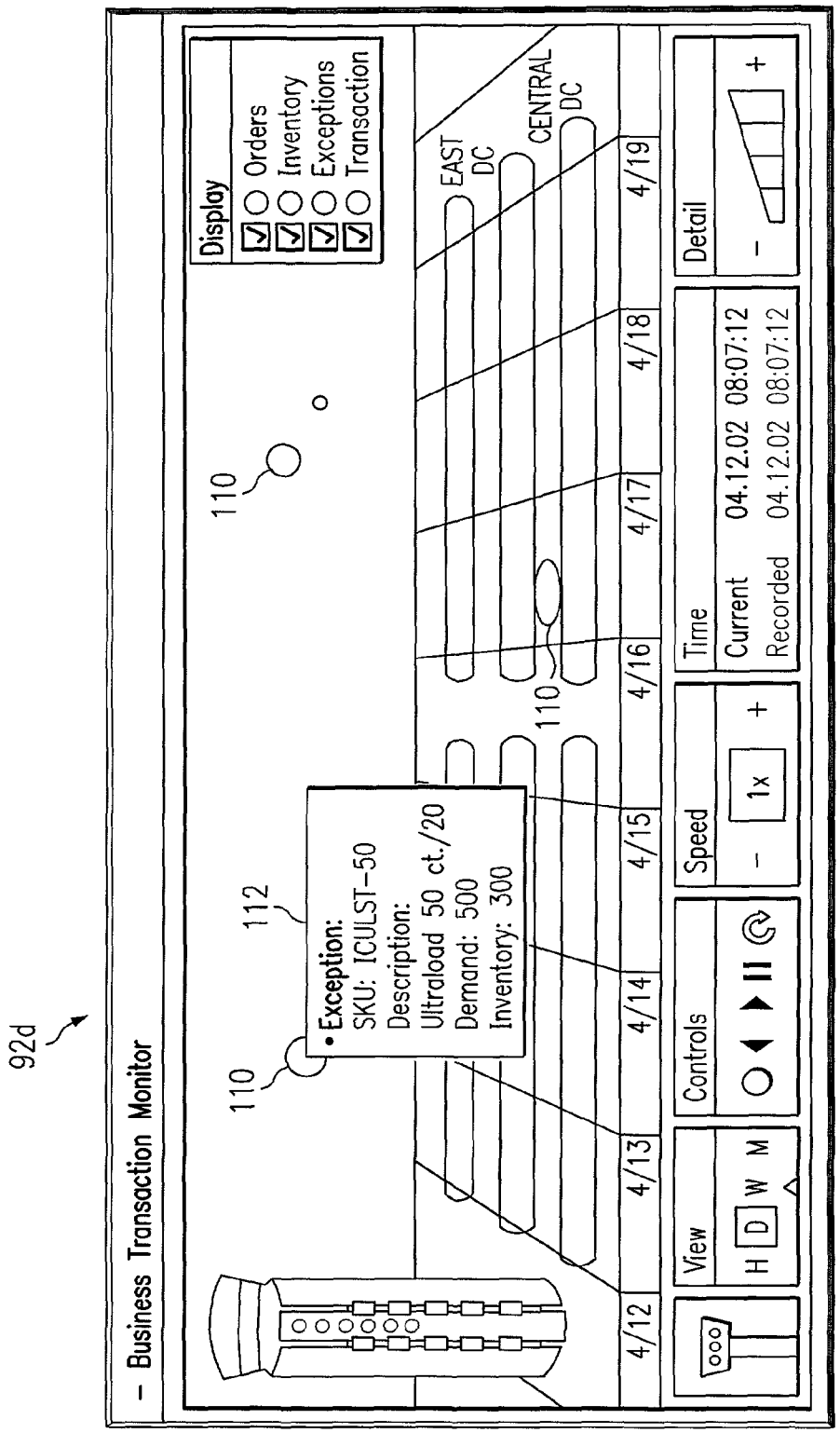
FIG. 6 illustrates an example business transaction monitor juke.

FIG. 6 illustrates an example business transaction monitor juke 92*d*, which may be incorporated in a UI such as UI 90 described above with reference to FIG. 5. Business transaction monitor juke 92*d* dynamically monitors incoming orders and exceptions according to their filtered severity and "time to impact." In one embodiment, for example, juke 92*d* may strictly monitor the filter components 56 and underlying messages received in offers 38 or requests 42 generated by any number of transaction or planning applications. A user of juke 92*d* might be able to brush over each "blip on the radar" or other display element 110 to view associated details 112 or click on a display element 110 to launch another juke 92 with controls over the associated process.

As another example, one or more jukes 92 may be displayed as part of a command center UI (not shown). This UI may generate a display of any suitable size, for example, a wall size display for an executive user. This UI would preferably be extremely flexible and include information associated with offers 38 and/or requests 42 from a variety of applications including, for example, catalogs, logistics, scheduling, collaboration, and other web-based structures. The user may send offers 38 and/or requests 42 to prompt alerts and workflows within or between enterprises. The user defines what and how much data associated with each such application is shown. Global monitoring of messages may be filtered, for example, to extreme exceptions.

Figure 7A:
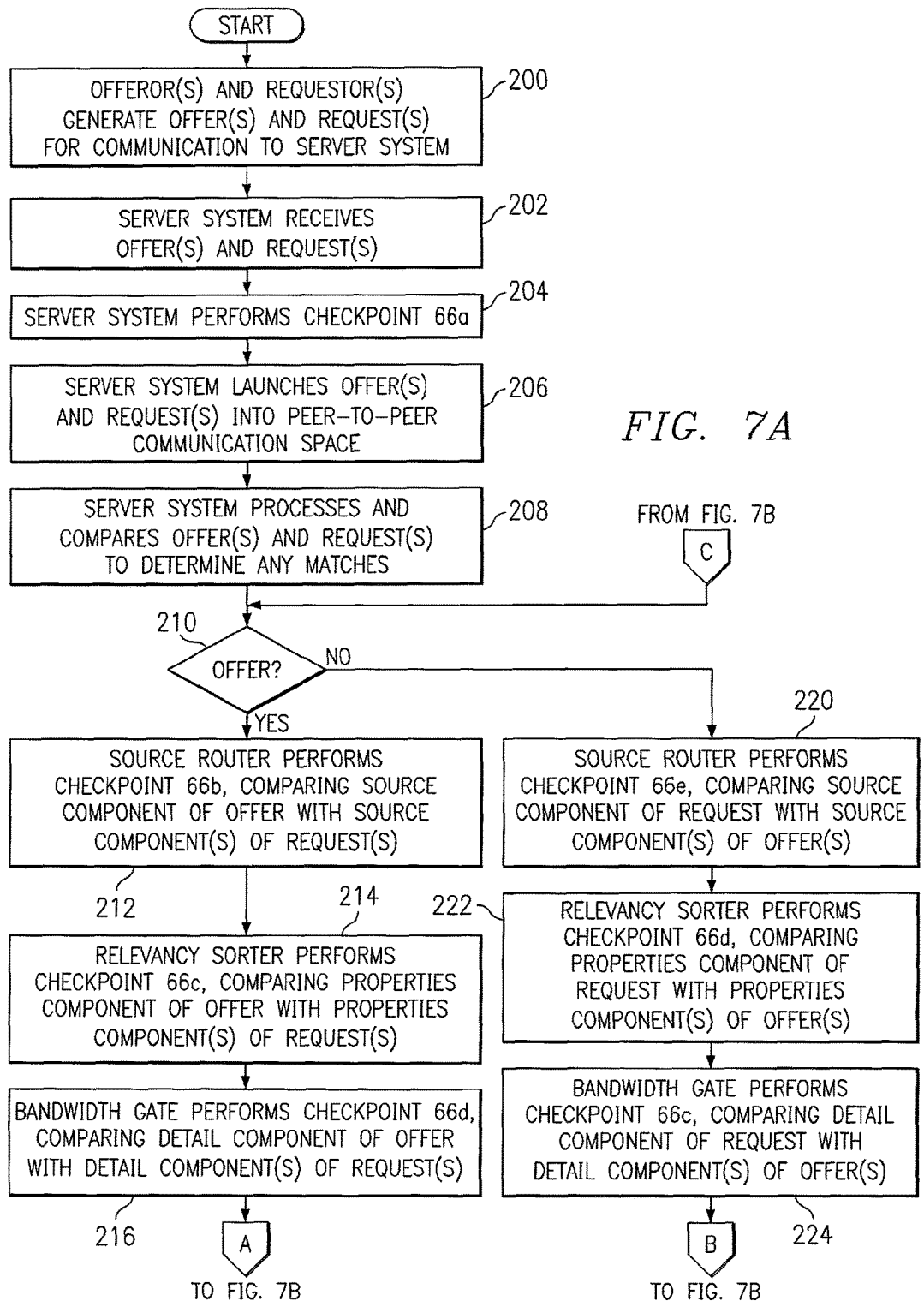
FIGS. 7A-7B illustrate an example method of filtered peer-to-peer business communication in a distributed computer environment.
Figure 7B:
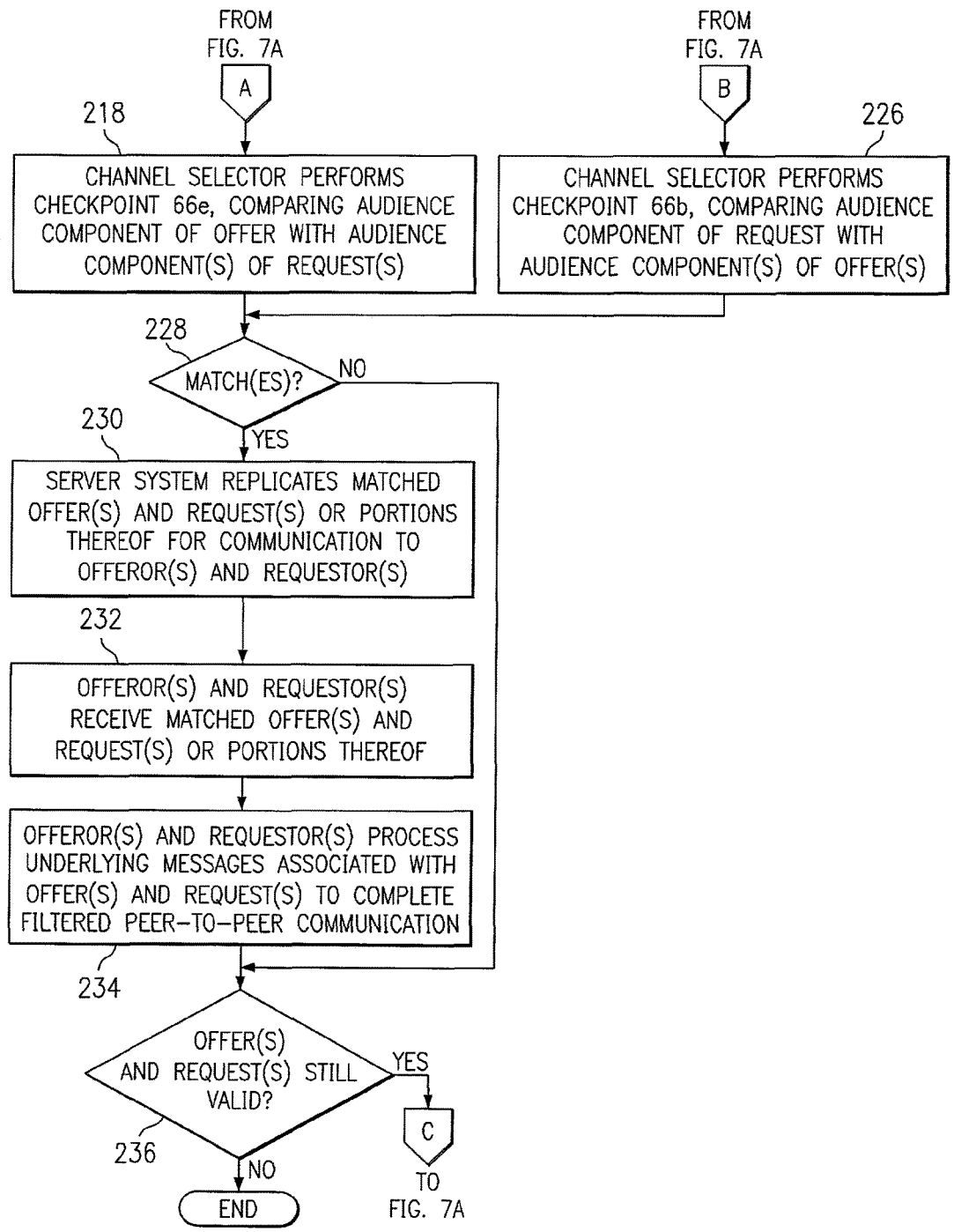

FIGS. 7A-7B illustrate an example method of filtered peer-to-peer business communication in a distributed computer environment. Description of the example method below will assume for the sake of brevity that offerors 32 and requestors 34 have registered with server system 54 and that any other preliminary activities have been appropriately handled. In addition, although the method is described with discrete steps, the present invention contemplates a step being performed for one or more offers 38 and/or one or more requests 42 at a different time than the step is performed for one or more other offers 38 and/or one or more other requests 42. For at least certain steps, one or more instances of a step may be performed substantially simultaneously or overlapping in whole or in part with respect to the same one or more offers 38 and/or one or more requests 42. In one embodiment, the method is performed substantially continuously while server system 54 is operating, as numerous offerors 32 and requestors 34 attempt filtered peer-to-peer communication according to their particular needs.

The method begins at step 200, where one or more offerors 32 and one or more requestors 34 may each generate and transmit one or more offers 38 or one or more requests 42, respectively, including associated filter components 56, for communication to server system 54. In one embodiment, generation of all filter components 56 for an offer 38 or request 42 occur at checkpoint 66a based at least in part on filter component data specified by the associated offeror 32 or requestor 34. As described above, filter components 56 for requests 42 may be transmitted in reverse order compared to filter components 56 of offers 38. At step 202, server system 54 receives offers 38 and requests 42 from offerors 32 and requestors 34, respectively. At step 204, server system 54 performs checkpoint 66a. At step 206, assuming any validations performed in association with checkpoint 66a are satisfied, server system 54 launches one or more offers 38 and one or more requests 42 into peer-to-peer communication space 52. At step 208, server system processes and compares offers 38 and requests 42 to determine any matches 46.

From the perspective of an offer 38 (step 210), source router 72 performs checkpoint 66b, comparing source component 58 of offer 38 with source components 58 of one or more requests 42 at step 212. At step 214, relevancy sorter 74 performs checkpoint 66c, comparing properties component 60 of offer 38 with properties components 60 of one or more requests 42. At step 216, bandwidth gate 76 performs checkpoint 66d, comparing detail component 62 of offer 38 with detail components 62 of one or more requests 42. At step 218 of FIG. 7B, channel selector 78 performs checkpoint 66e, comparing audience component 64 of offer 38 with audience components 64 of one or more requests 42.

From the perspective of a request (step 210), source router 72 performs checkpoint 66b, comparing source component 58 of request 42 with source components 58 of one or more offers 38 at step 220. At step 222, relevancy sorter 74 performs checkpoint 66c, comparing properties component 60 of request 42 with properties components 60 of one or more offers 38. At step 224, bandwidth gate 76 performs checkpoint 66d, comparing detail component 62 of request 42 with detail components 62 of one or more offers 38. At step 226 of FIG. 7B, channel selector 78 performs checkpoint 66e, comparing audience component 64 of request 42 with audience components 64 of one or more offers 38.

If there are one or more matches 46 at step 228, server system 54 replicates matched offer(s) 38 and request(s) 42 or portions thereof at step 230 for communication to the associated offeror(s) 32 and requestor(s) 34. At step 232, these offeror(s) 32 and requestor(s) 34 receive the matched offer(s) 38 and request(s) 42 or portions thereof. At step 234, these offeror(s) 32 and requestor(s) 34 process the underlying messages associated with the matched offer(s) 38 and request(s) 42 to complete filtered peer-to-peer communication between the offeror(s) 32 and requestor(s) 34. If there are no matches 46 at step 228 and a compared offer 38 or request 42 is still valid at step 236, then the method returns to step 210 of FIG. 7A with respect to that offer 38 or request 42. If a compared offer 38 or request 42 is no longer valid at step 236, then the method ends with respect to that offer 38 or request 42. The present invention contemplates an offer 38 or request 42 being repeatedly compared with requests 42 or offers 38, respectively, essentially indefinitely provided the offer 38 or request 42 remains valid.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system of matching an offer and a request, the system comprising:
   a computer system accessing offers associated with one or more offerors and requests associated with one or more requestors, the computer system configured to:
   select one or more offers comprising meta-data;
   select one or more requests comprising meta-data;
   match without additional user input, the one or more offers with the one or more requests by using one or more filter components comprising a detail component, the detail component comprising total minimum size of the request, bandwidth requirements of the request, and platform specific tags;
   replicate a portion of the matching offer and the matching request; and
   communicate the replicated portion of the matching offer and the matching request to at least one of the one or more offerors associated with the matching offer and at least one of the one or more requestors associated with the matching request.

2. The system of claim 1, wherein matching the one or more offers with the one or more requests further comprises using a magnetic interaction paradigm with the one or more filter components.

3. The system of claim 1, wherein matching the one or more offers with the one or more requests further comprises using a multidimensional matching technology with the one or more filter components.

4. The system of claim 1, wherein matching the one or more offers with the one or more requests further comprises using one or more half empty data sets with the one or more filter components.

5. The system of claim 1, wherein communicating the replicated portion of the matching offer and the matching request comprises communicating at least a portion of the replicated portion of the matching offer and at least a portion of the matching request.

6. A system of communication using a communication protocol, the system comprising:
   a computer system accessing offers associated with one or more offerors and requests associated with one or more requestors, the computer system configured to:
   provide one or more filter components coupled with the computer system;
   provide access to the computer system to a plurality of user computers;
   receive information comprising meta-data comprising one or more filter components from a first user computer of the plurality of user computers;

receive information comprising meta-data comprising one or more filter components from a second user computer of the plurality of user computers; and communicate between the first user computer and the second user computer using the computer system by:

matching, without additional user input, the first user computer with the second user computer using at least one of the plurality of filter components comprising a detail component, the detail component comprising total minimum size of the request, bandwidth requirements of the request, and platform specific tags;

replicating a portion of the matching detail components; and communicating the replicated portion of the matching detail component to the first user computer and the second user computer.

7. The system of claim 6, wherein the computer system is further configured to translate the language of the information provided by the first user computer.

8. The system of claim 6, wherein the computer system is further configured to translate the language of the information provided by the second user computer.

9. The system of claim 6, wherein the first user computer is an offeror and the second user computer is a requestor.

10. The system of claim 6, wherein the first user computer is a requestor and the second user computer is an offeror.

11. The system of claim 6, wherein communicating between the first user computer and the second user computer comprises communication types selected from the group consisting of one to one, one to many, many to one, and many to many.

12. A system for filtered peer-to-peer business communication in a distributed computer environment, comprising:

a computer system accessing offers associated with one or more offerors and requests associated with one or more requestors, each offer and each request comprising two or more filter components; and a bandwidth gate coupled with the computer system for comparing detail components of the one or more offers with a detail component of a request to determine whether the detail components of the offers match the detail component of the request, wherein the computer system is configured to determine a match between an offer and the request based on whether the filter components of the offer match the corresponding filter components of the request, replicate a portion of the matching offer and the matching request, and communicate the replicated portion of the matching offer and the matching request to at least one of the one or more offerors associated with the matching offer and at least one of the one or more requestors associated with the matching request; and a user interface associated with an offeror or requestor, the user interface when associated with an offeror displaying content determined according to settings in offers from the offeror and filtering component data of matching requests received by the offeror, the user interface when associated with a requestor displaying content determined according to settings in requests from the requestor and filtering component data of matching offers received by the requestor.

13. The system of claim 12, further comprising: a source router for comparing source components of one or more offers with a source component of the request to determine whether the source components of the offers match the source component of the request.

14. The system of claim 13, further comprising: a relevancy sorter for comparing properties components of the one or more offers with a properties component of the request to determine whether the properties components of the offers match the properties component of the request.

15. The system of claim 14, further comprising: a channel selector for comparing audience components of the one or more offers with an audience component of the request to determine whether the audience components of the offers match the audience component of the offer, the audience component of each offer comprising information concerning the intended audience for the offer and one or more audience Response to Office Action requirements for any matching requests, the audience component of the request comprising information concerning the intended audience of the request and one or more audience requirements for any matching offers.

16. The system of claim 14, wherein the message being communicated using the offer or request is located external to the offer or request and is referenced in one or more filter components of the offer or request.

17. The system of claim 15, wherein the audience component of an offer or request comprising one or more of the following: a groups field specifying one or more groups of requestors or offerors to which the offer or request is intended, a parties field specifying one or more requestors or offerors for which the offer or request is intended, a state field specifying an allowed state for a requestor or offeror, a proximity field specifying a required proximity for a requestor or offeror, a specificity field indicating an audience specificity for the offer or request, an urgency field specifying the urgency of the offer or request, and a fourth external address field referencing an external information source for further audience information.

18. The system of claim 12, wherein the computer system is further configured to assign priority to the filter components of a request according to the order in which the filter components appear in the request in determining whether offers match the request or in determining the order in which to present matching offers to the requestor.

19. The system of claim 12, wherein the computer system is further configured to:

translate filter component data of a request to an appropriate language in order to determine a match between the request and one or more offers; and if a match is determined, the computer system is further configured to translate at least a portion of the filter component data of the request to a language specified in the filter component data of the matching offer for communication to the offeror associated with the matching offer.

20. The system of claim 12, wherein:

the offers comprise half data sets;

the requests comprise half data sets; and the computer system is further configured to complete a half data set of an offer with a corresponding half data set of a matching request and to complete a half data set of a request with a corresponding half data set of a matching offer.

* * * * *